(12) United States Patent
Wang et al.

(10) Patent No.: US 7,955,218 B2
(45) Date of Patent: Jun. 7, 2011

(54) AUTOMOBILE ANTICOLLISION DECELERATING AND EMERGENCY BRAKE APPARATUS

(76) Inventors: Dahuai Wang, Hunan (CN); Yue Zhao, Hunan (CN)

( * ) Notice: Subject to any disclaimer, the term of this patent is extended or adjusted under 35 U.S.C. 154(b) by 694 days.

(21) Appl. No.: 11/956,169

(22) Filed: Dec. 13, 2007

(65) Prior Publication Data

US 2009/0071791 A1    Mar. 19, 2009

(30) Foreign Application Priority Data

Sep. 17, 2007  (CN) .......................... 2007 1 0153898

(51) Int. Cl.
| | |
|---|---|
| *B60W 10/04* | (2006.01) |
| *B60W 10/18* | (2006.01) |
| *B60W 10/02* | (2006.01) |
| *B60K 26/00* | (2006.01) |
| *B60K 26/02* | (2006.01) |

(52) U.S. Cl. ................... 477/193; 477/182; 192/12 BA; 192/13 A; 192/12 D

(58) Field of Classification Search ............ 477/182, 477/184, 187, 190, 192, 193; 701/70, 71, 701/78, 79, 301; 192/12 R, 13 R, 13 A, 12 A, 12 B, 12 BA, 12 D
See application file for complete search history.

(56) References Cited

U.S. PATENT DOCUMENTS

| | | | | |
|---|---|---|---|---|
| 4,602,705 | A | * | 7/1986 | Farr et al. .................. 188/181 A |
| 4,715,483 | A | * | 12/1987 | Hobson et al. ............. 192/219.2 |
| 5,835,868 | A | * | 11/1998 | McElroy et al. .................. 701/2 |
| 7,673,949 | B2 | * | 3/2010 | Kuramochi et al. ..... 303/122.03 |
| 7,677,367 | B2 | * | 3/2010 | Usui ............................. 188/156 |

\* cited by examiner

*Primary Examiner* — Tisha D Lewis
(74) *Attorney, Agent, or Firm* — Knoble Yoshida & Dunleavy, LLC

(57) ABSTRACT

An anticollision decelerating and emergency brake apparatus of automobile is disclosed. The objects of the invention is realized by the following: an anticollision decelerating and an emergency brake apparatus of automobile constituted by clutch (1), a energy-storage assembly (2), a brake force transmission assembly (3), a combined solenoid valve assembly (4), a housing (5), a variable diameter assembly (6), a reset mechanism (7), and so on. The apparatus of the invention will auto brake to effective prevent and avoid traffic accident, and the damage degree can be minimized.

14 Claims, 21 Drawing Sheets

AUTOMOBILE ANTICOLLISION DECELERATING AND EMERGENCY BRAKE
APPARATUS

CROSS REFERENCES TO RELATED APPLICATIONS

This is a U.S. National Stage Application which claims the benefit of priority, under 35 U.S.C. §120(d) to Chinese Application No. CN 200710153898.6, filed on Sep. 17, 2007.

BACKGROUND OF THE INVENTION

1. Field of the Invention

The present invention relates to an anticollision system and an anticollision apparatus for any vehicle. The invention may be particularly beneficial as an anticollision system for automobiles.

2. Description of the Related Technology

With the advancement and development of society and the economy, the automobile industry is becoming a fast developing industry. The fast growing automobile industry in China not only marks the advancement of manufacturing industries, but also is an indicator of the continuously improving living standard. However, it can not be ignored that with the increasing number of automobiles on the roads, the number of traffic accidents and traffic fatalities have increased.

One of the most prevalent accidents is vehicular collisions. In order to effectively prevent the occurrence of collisions, and avoid consequential damages and losses, efforts have been made to develop effective anticollision technologies.

SUMMARY OF THE INVENTION

The present invention is directed to provide an anticollision decelerating and emergency brake apparatus for automobiles adapted with active safety technology. The apparatus is one part of the active anticollision intelligent safety system of automobile. Combined with intelligent anticollision identification system, the apparatus can effectively prevent and avoid the collisions occurring when driving an automobile. When a drive does not react promptly upon a collision that may take place, the apparatus will perform decelerating or emergency break automatically to effectively prevent and avoid occurrence of a collision accident or minimize the damage in extreme cases.

The object of the invention is realized by the follow technical solutions: an anticollision decelerating and an emergency brake apparatus of automobile comprises combined clutch (11), a energy-storage assembly (2), a brake force transmission assembly (3), a combined solenoid valve assembly (4), a housing (5), a variable diameter assembly (6), and a reset mechanism (7).

DETAILED DESCRIPTION OF THE PREFERRED EMBODIMENTS

The present invention is directed to an anticollision system and apparatus having a number of novel safety features designed to prevent vehicular collisions. The anticollision system includes a collision sensor and an anticollision safety apparatus capable of determining the potential occurrence of and preventing an imminent collision. When a vehicle does not initiate corrective measures immediately prior to impacting an object, the collision sensor will first identify the threat of a potential collision. After identifying a potential collision, the anticollision system will automatically activate the emergency brake operatively connected to the anticollision apparatus to either avoid the occurrence of, or in an extreme case, minimize the damage resulting from a collision. The collision sensor of the present invention may be capable of detecting and/or predicting the possibility of any imminent collision with a static or moving object. The sensor is preferably capable of determining the possibility of a head-on collision.

Figure 1:
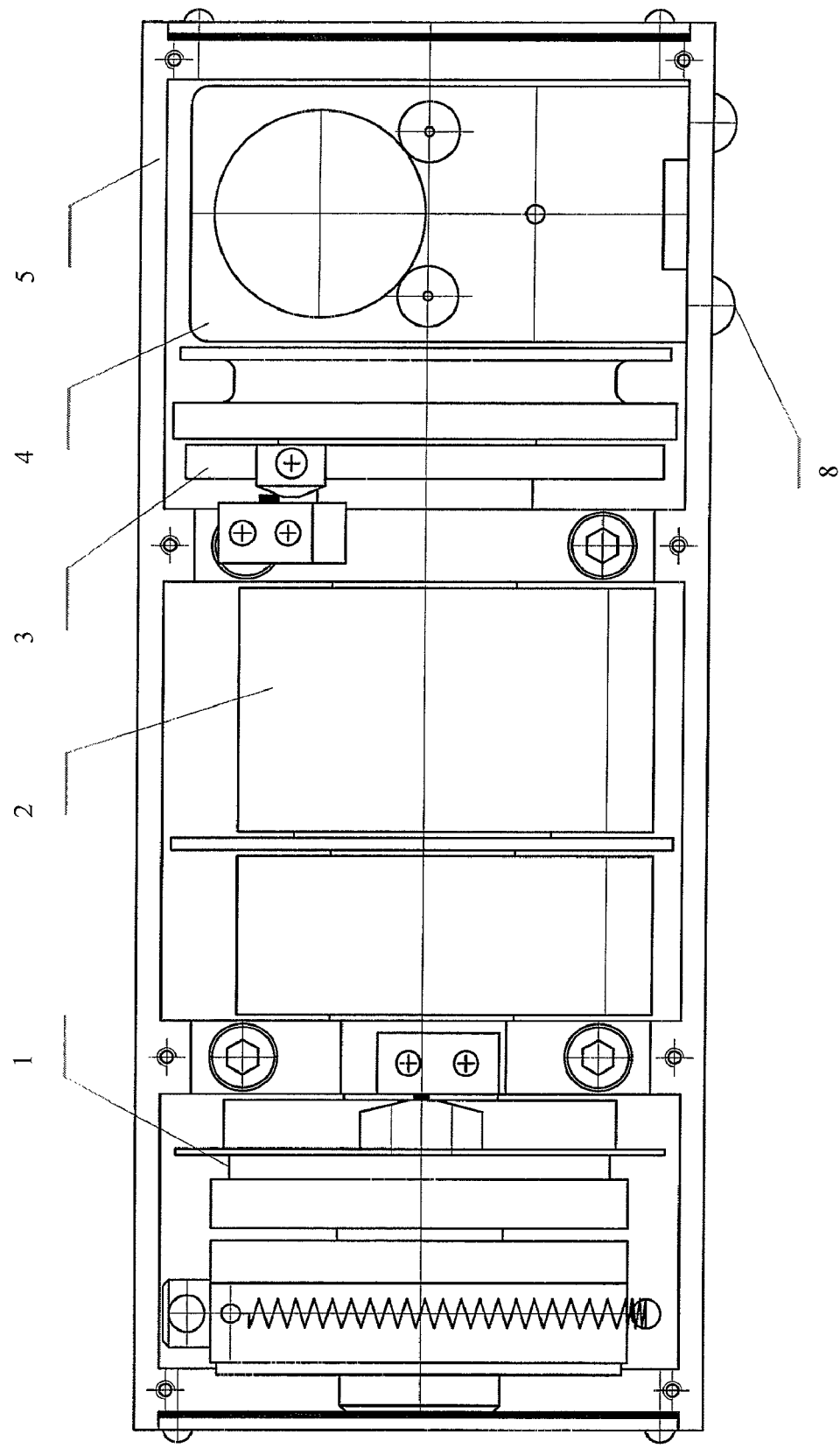
FIG. 1 is a general assembly drawing of the invention.
Figure 2:
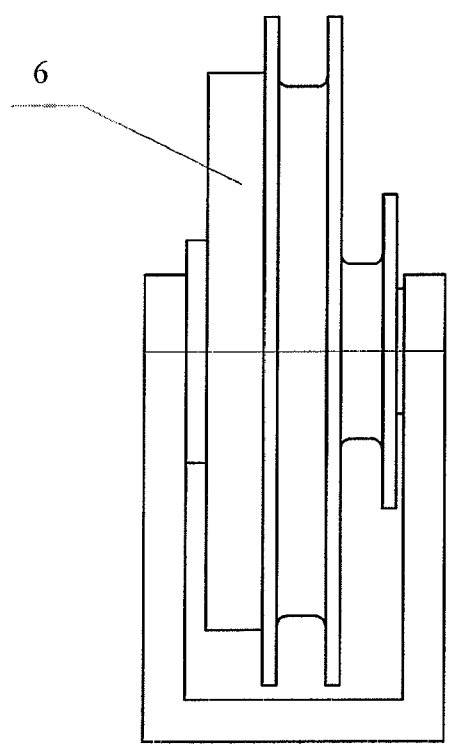
FIG. 2 is a diagram of the solenoid valve assembly.
Figure 3:
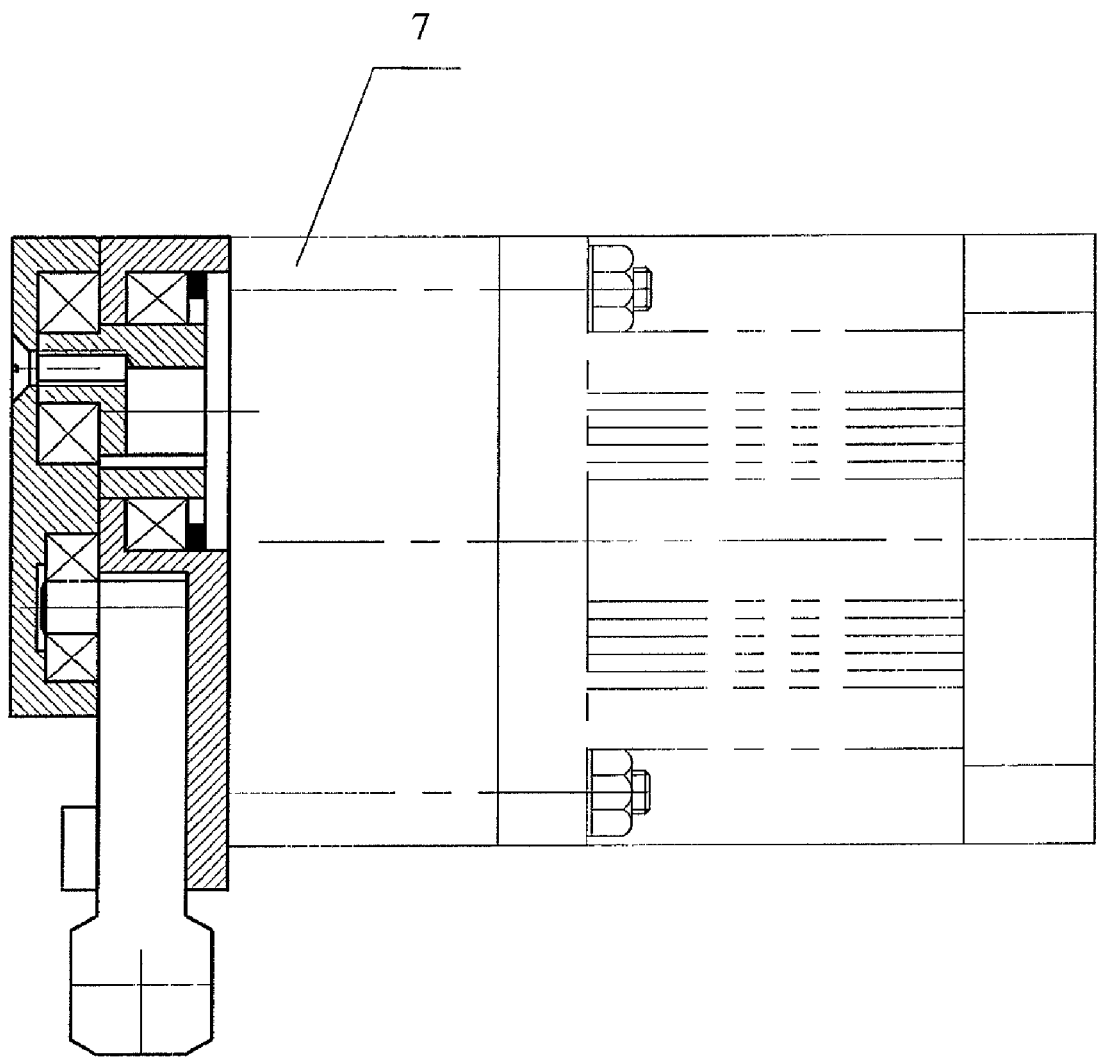
FIG. 3 is a diagram of the combined clutch assembly.

FIG. 1 shows the basic structure of the anticollision apparatus of the present invention. The apparatus includes: 1a combined clutch (1), an energy-storage assembly (2), a brake force transmission assembly (3), a combined solenoid valve assembly (4), a housing (5), a variable diameter wheel (6), and a reset structure (7). In accordance with the present invention, when the collision sensor determines the possible occurrence of an imminent collision, the anticollision system activates an existing emergency brake, which applies a braking force to wire rope (58) of solenoid valve assembly (4). A variable wheel assembly (6) magnifies the applied emergency brake force to assure that the anticollision apparatus is capable of decelerating or stopping the vehicle. Solenoid valve assembly (4) then releases and transfers the magnified brake force of wire rope (58) to at least one ratchet wheel (160, 64) of the brake force transmission assembly (3). The braking force is subsequently transferred from ratchet wheel (160, 64) to at least one spring (52, 45) of energy energy-storage assembly (2), which enables a vehicle to immediately brake. After the threat of impact has passed, reset mechanism (7) subsequently resets the component of energy-storage assembly (2) by rotating clutch (1).

I. Housing

Figure 16:
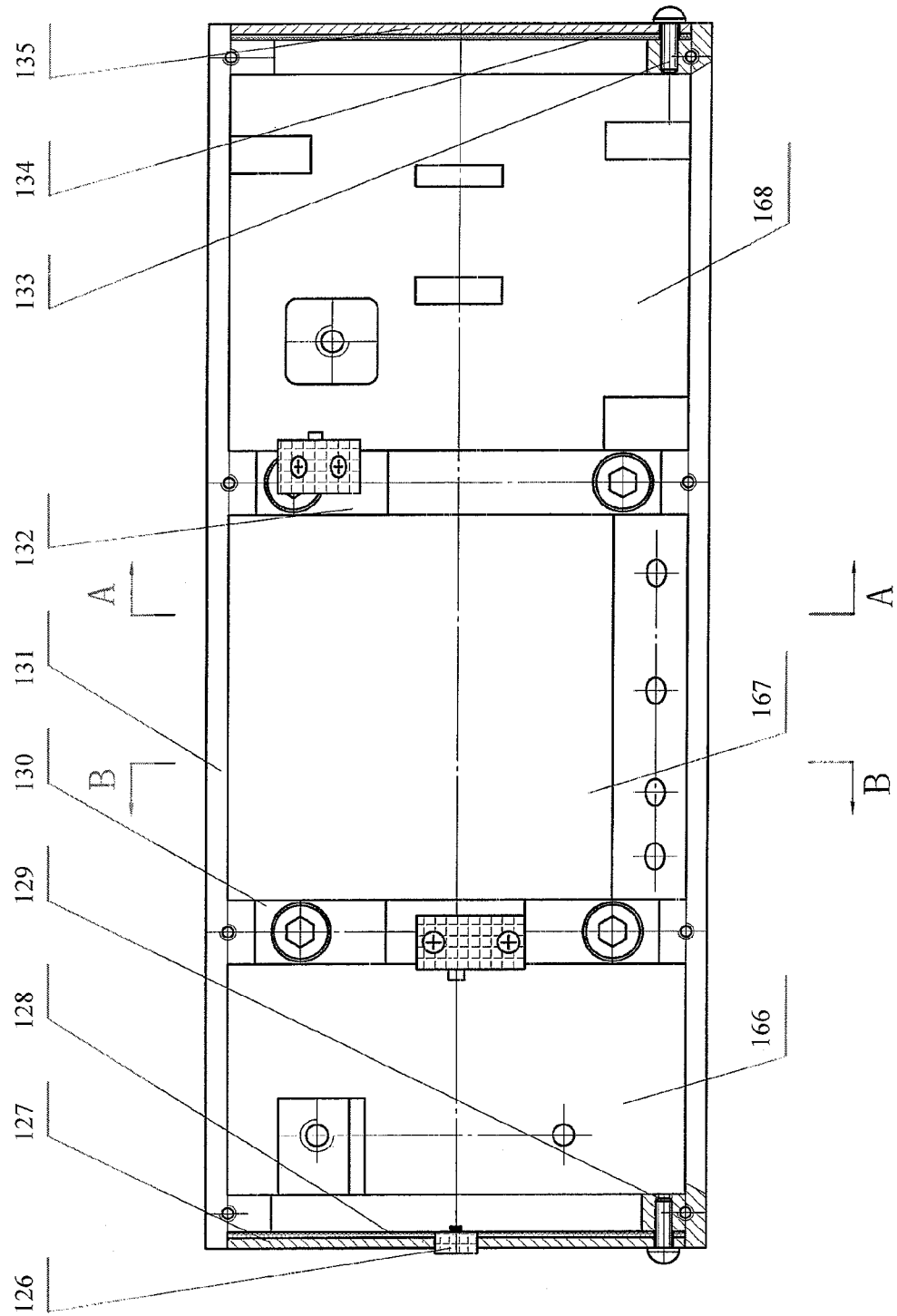
FIG. 16 is a diagram of the housing.
Figure 17:
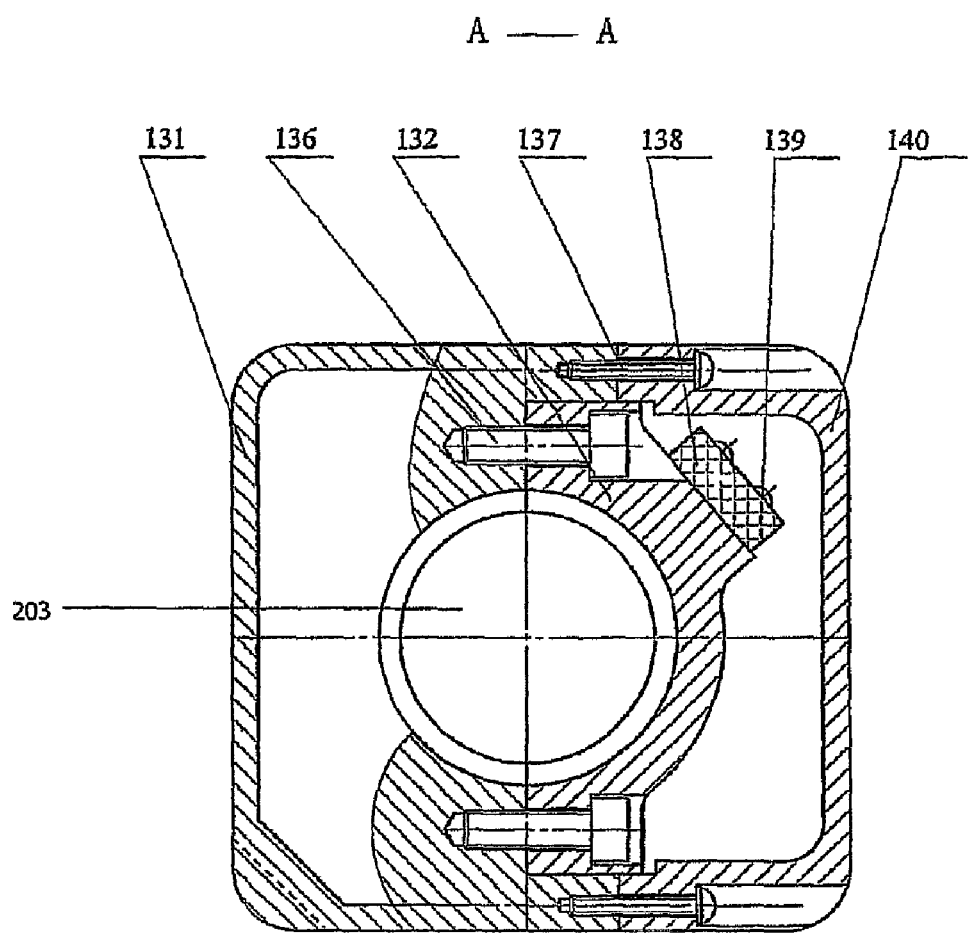
FIG. 17 shows a cross section A-A of FIG. 16.
Figure 18:
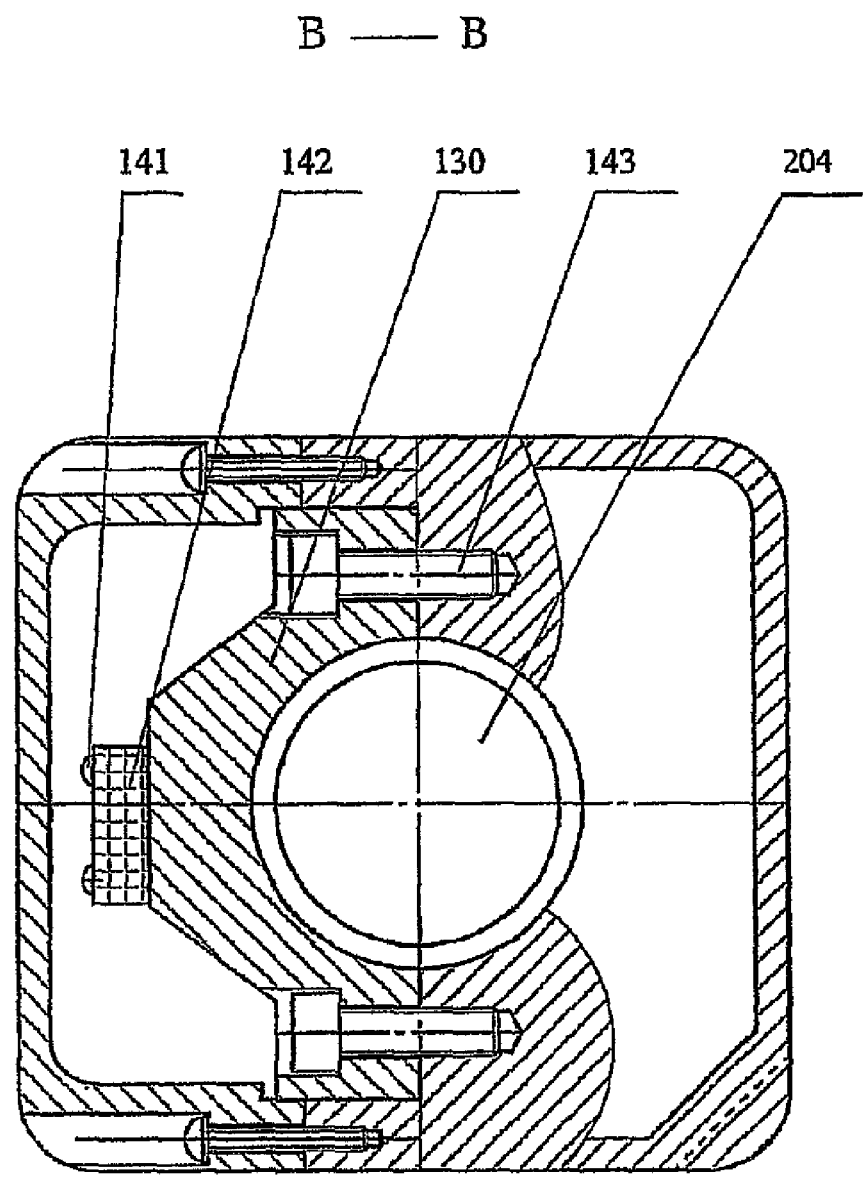
FIG. 18 shows a cross section B-B of FIG. 13.

Housing (5) of the present invention houses and protects the parts, components and assemblies of the anticollision apparatus from water, foreign matter, such as dust, and other forms of contamination. Preferably housing (5) is an air-tight and water-tight container. As shown in FIGS. 16-18, housing (5) may include: at least one micro-switch (126, 138, 142), at least one end cap (127, 135), at least one air proof seal (128, 134), at least one suitable fastner, such as a bolt (129, 136, 137, 139, 141, 143), at least one bearing cap (130, 132), a frame (131), and a air proof casing (140).

As shown in FIG. 16, frame (131) of housing (5) may be divided into three cavities: cavity I (165), cavity II (166), and cavity III (167). Cavity I (165) may contain a combined clutch (11). Cavity II (166) may be used to house an energy-storage assembly (2). A Brake force transmission assembly (3) and a combined solenoid valve assembly (4) may be placed within cavity III (168). The location of the combined clutch (1), combined solenoid valve assembly (4) and brake force transmission assembly (3) may be interchanged upon suitable modification of housing (5). Semicircle-shaped holes serving as bearing plates may be formed between cavity I (166) and II and between cavity II (167) and III (168), as shown in FIGS. 17-18. At least one bearing cap (132, 130) may be installed using any suitable fastener, including a bolt (136, 143). Housing 5 may further comprise two end caps (127, 135), one installed at each end of frame (131) using any suitable fastener, including a bolt (129, 133). At least one air proof I seal (128, 134) may be placed tightly adjacent to the end caps 1 (127, 127, 135). At least one micro-switch (138, 138, 142) may be installed on a bearing cap (132, 130) using any suitable fastener, such as a bolt (139, 141). Additionally an air proof seal (140) may be installed on frame (131) using any suitable fastener, such as a bolt (137).

II. Energy Storage Assembly

Figure 6:
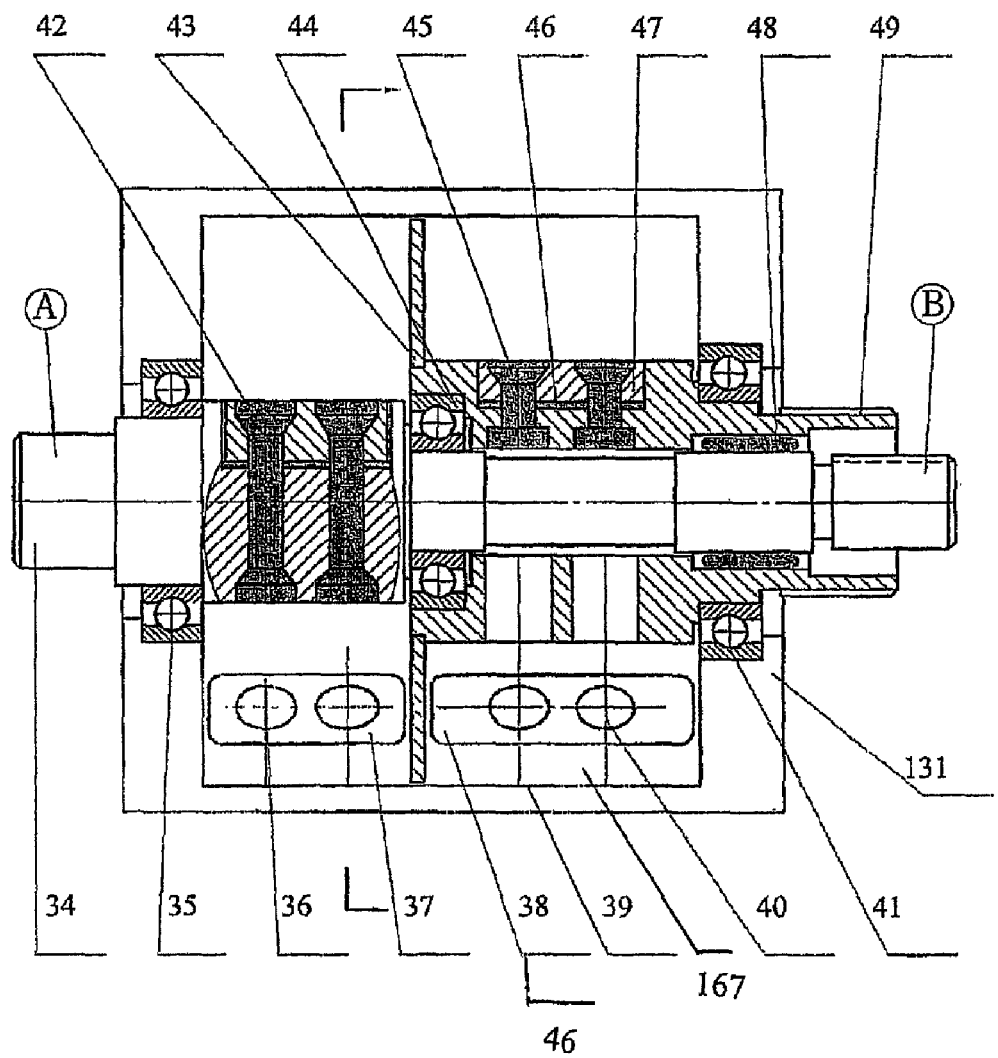
FIG. 6 is a diagram of the energy-storage assembly.
Figure 7:
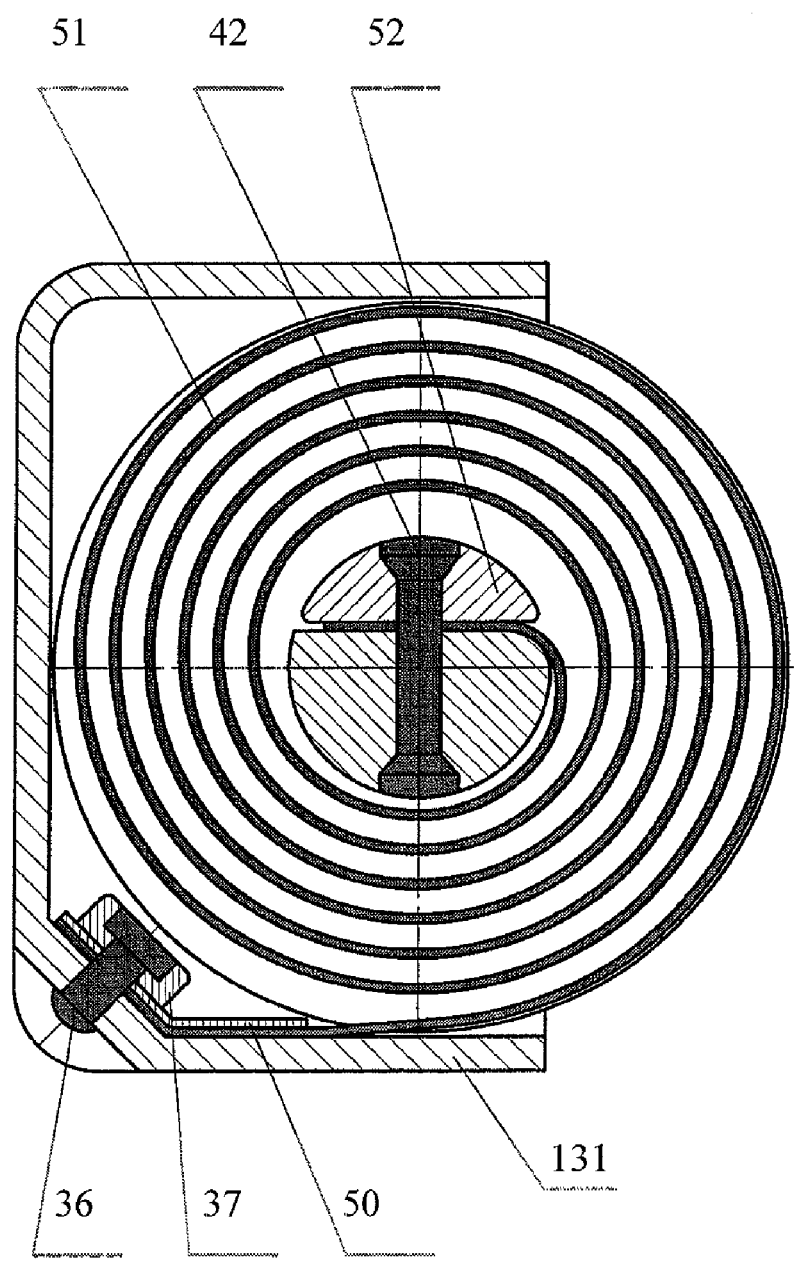
FIG. 7 shows the spring system of the energy-storage assembly.

The energy-storage assembly (2) of the present invention, as shown in FIGS. 6-7, provides a power source for the anticollision apparatus and enables braking of a vehicles. The energy-storage assembly (2) includes a spindle (34), at least one fastener, such as bearing (35, 41, 44, 48) and rivet (36, 40, 42, 45), at least one external block (37, 38), at least one liner (39, 50), a partition board (43), at least one spring (46, 51), at least one an internal block (47, 52), and at least one transmission shaft (49).

Figure 4:
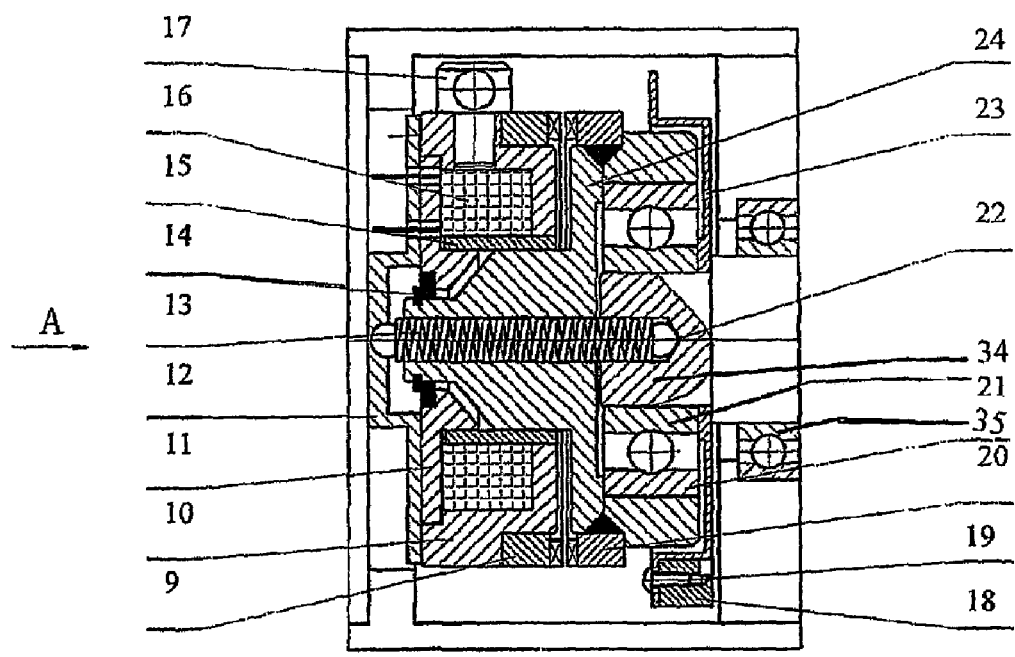
FIG. 4 is a diagram of a portion of the combined clutch assembly.
Figure 10:
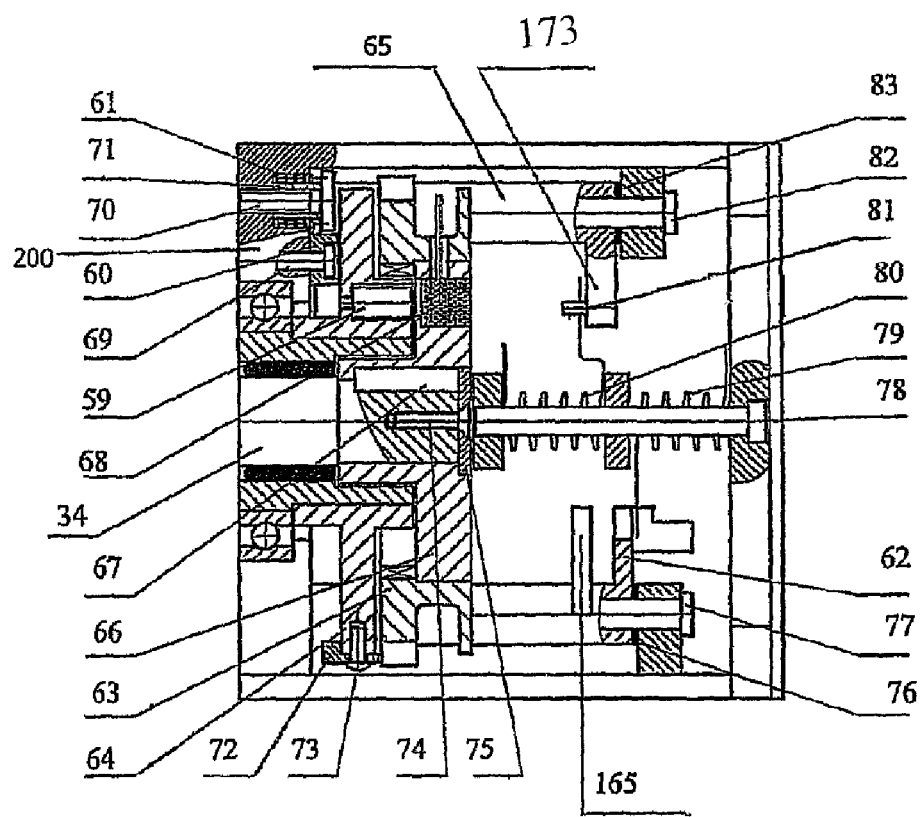
FIG. 10 shows the system of brake force transmission assembly.
Figure 11:
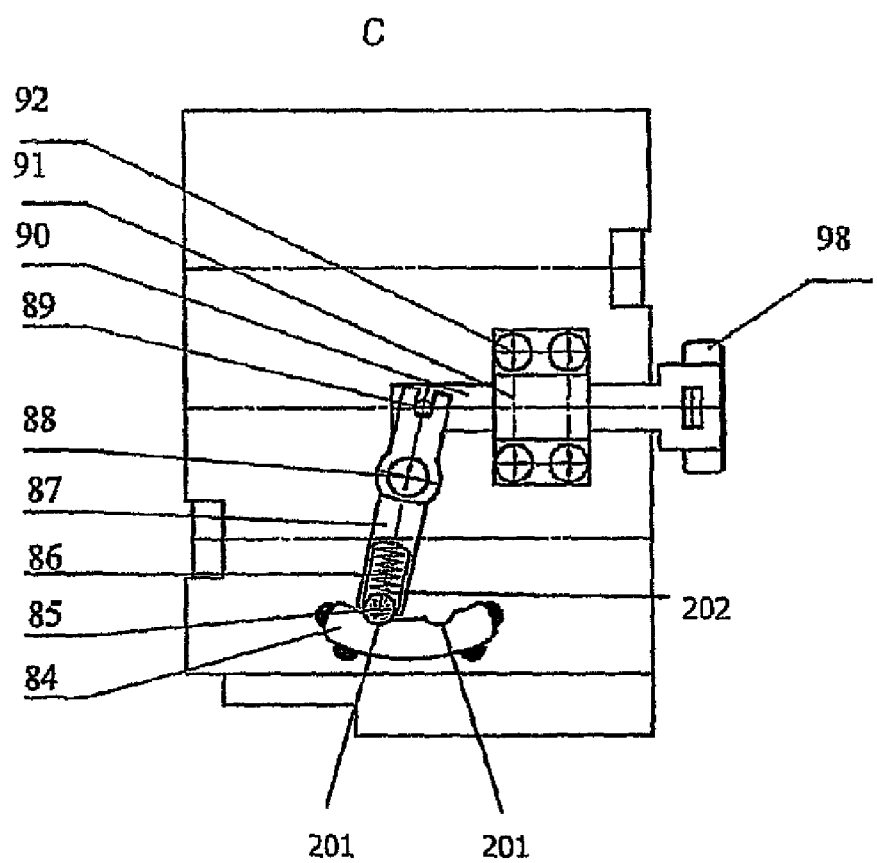
FIG. 11 is a diagram of the combined solenoid valve assembly.

An inner end of spring (51) is riveted to spindle (34) by rivet (42) and the internal block (52), as shown in FIG. 7. An outer end of spring (51) is riveted to cavity II (167) of frame (131) by rivet (36), the liner (50) and external block (37). An inner end of the spring (46) is riveted to transmission shaft (49) by the rivet (45) and internal block (47), as shown in FIG. 6. An outer end of spring (46) is riveted to cavity II (167) of frame (131) by the rivet (40), liner (39) and external block (38). The bearing (35) engages with the left end of spindle (34) and is installed in a bearing hole (203) between cavity I (166) and cavity II (167) of frame (131). Bearing (41) engages with the right end the transmission shaft (49) and is installed in the bearing hole (204) between cavity II (167) and cavity III (168) of frame (131). Bearing (44) and bearing IV (48) are installed in the two inner holes of the second transmission shaft (49) respectively and engage spindle (34). Partition board (43) is tightly fitted on the left end of the transmission shaft (49) to isolate spring I (51) and spring II (46). As shown in FIG. 6, end A of the spindle (34) is installed in the inner hole of the overrunning clutch (21) of the combined clutch (11), as shown in FIG. 4. End B of the spindle (34) is coupled to the inner ring (66) of brake force transmission assembly's (3) ratchet wheel, as shown in FIG. 10. The right end of transmission shaft (49) is coupled to ratchet wheel I (64) of the brake force transmission assembly (3). Both the spindle (34) and the second transmission shaft (49) can rotate freely on their axis respectively.

Energy-storage assembly (2) functions to provide a braking force for a vehicle by releasing at least one spring (51, 46) operatively connected to spindle (34). In accordance with the present invention, end A of the spindle (34) receives a radial torque force from the combined clutch (1) to simultaneously tighten spring I (51) and spring II (46). Alternatively, spring I (51) may be tightened when the spring II (46) is in an unreleased stage, so that the energy-storage assembly (2) is in the state of energy storage. When spring I (51) is released alone, it provides a brake force for slowing down an automobile. When both spring I (51) and spring II (46) are released, it provides a braking force for enabling an emergency braking of the automobile. The torque force of spring I (51) is released via ratchet wheel II (160) of the brake force transmission assembly (3) coupled to end B of spindle (34). The torque force of spring II (46) is released via ratchet wheel I (64) of the brake force transmission assembly (3) coupled to the right end of transmission shaft (49). Desired cycling of energy storage and release is thus realized by the above-discussed mechanism.

III. Brake Force Transmission Assembly

Figure 8:
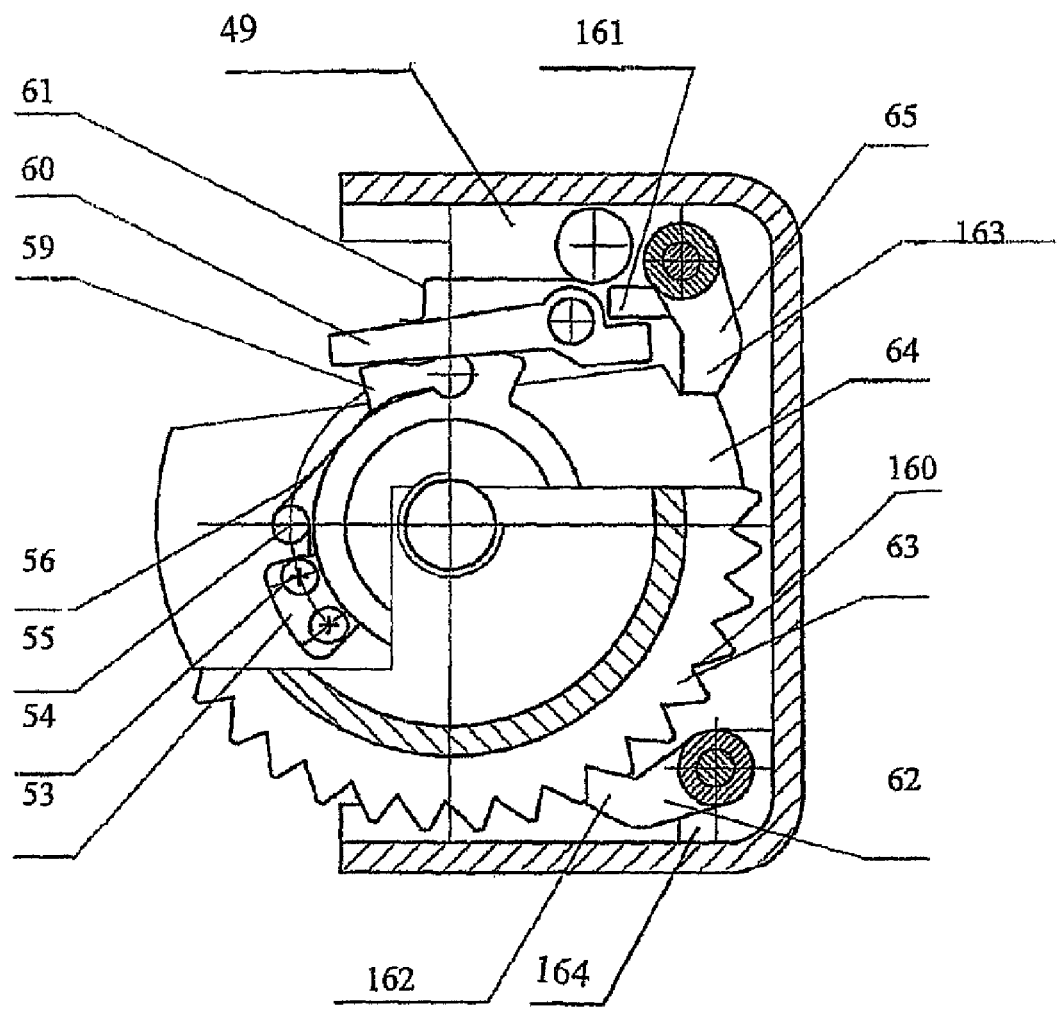
FIG. 8 is a diagram of the brake force transmission assembly.
Figure 9:
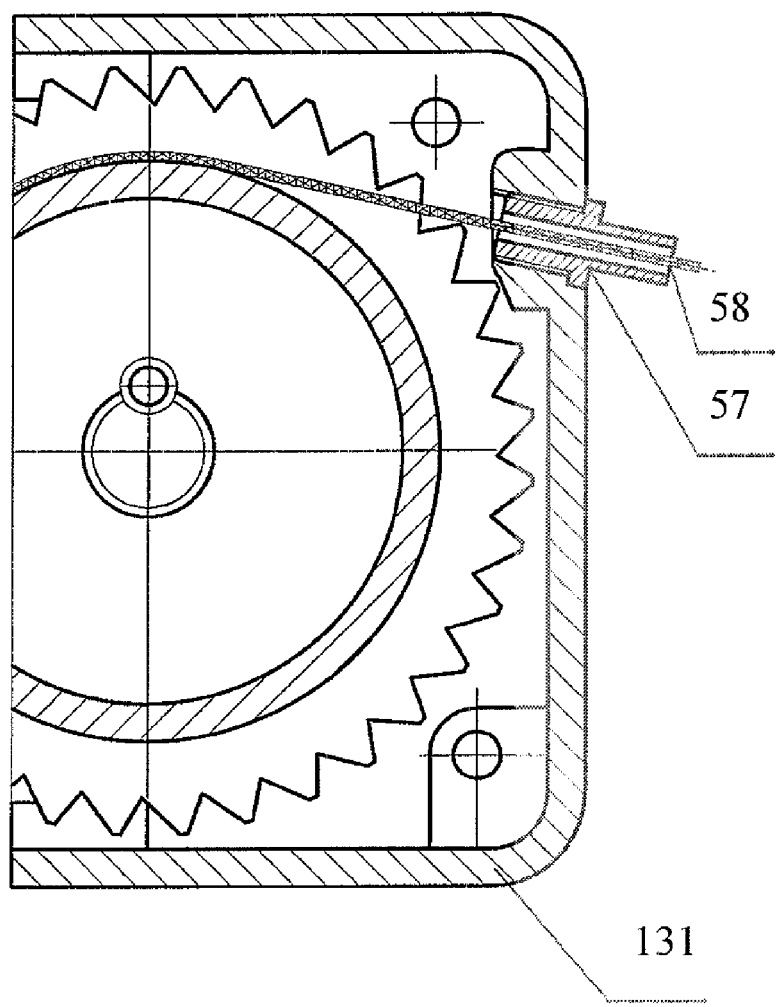
FIG. 9 shows the flexible wire rope of the brake force transmission assembly.

As shown in FIGS. 8-10, The brake force transmission assembly (3) includes a pressing plate (53), at least one fastener, such as bolt (54, 73, 74), at least one pin (55, 81, 69, 70, 67), at least one spring (56, 61, 80, 79), a rope guiding sleeve (57), a flexible wire rope (58), a pawl (59), a lifting bar (60), at least one unlocking shifting fork (62, 65), a ratchet wheel's outer ring (63), at least one ratchet wheel (64), a ratchet wheel's inner ring (66), a rope buckle (68), a centering casing (71), a contact (72), a gasket (75), at least one washer (76, 83), at least one pivotal axis of a shifting fork (77, 82), and at least one a shifting fork's reset spring spindle (78).

Ratchet wheel I (64) of the brake force transmission assembly (3) is connected with the end B of transmission shaft (49) of the energy-storage assembly (2), as shown in FIG. 10. A pawl (59) is provided on one side of ratchet wheel I (64). As shown in FIG. 8, pressing plate (53), bolt (54) and pin (55) installed on ratchet wheel I (64) fix and center spring (56) for resetting pawl (59). This setup provides circumferential tension to the pawl (59) at all times. As shown in FIG. 8, a ratchet wheel II (160) is embedded together with outer ring (63). An inner ring (66) of ratchet wheel II (160) is coupled to end B of the spindle (34) of the energy-storage assembly (2). Optionally, outer ring (63) and inner ring (66) of ratchet wheel II (160) may be integrally formed. Key pin (67), gasket (75), and bolt (74) prevent inner ring (66) from rotating and separating from end B of spindle (34). An annular groove is formed in outer ring (63) of ratchet wheel II (160) to enable winding the flexible wire rope (58). One end of flexible wire rope (58) is attached to outer ring (63) of the ratchet wheel II (160) by the rope buckle (68). Flexible wire rope (58) winds along the circumference of outer ring 63 ring and extends through rope guiding sleeve (57) to the outside, as shown in FIG. 9. Optionally, the rope engaging ratchet wheel of brake force transmission assembly (3) can be separated from the brake force transmission assembly (3) to form a signal part. The rope engaging ratchet wheel may include at least one groove, preferably a plurality of grooves. Additionally, the brake force transmission assembly may comprise multiple rope engaging ratchet wheels. Pawl (59) engages with the inner teeth of outer ring (63) of ratchet wheel II (160) when pawl (59) is free of lifting gating (60), as shown in FIGS. 8 and 10, so that ratchet wheel I (64) will drive ratchet wheel II (160) or be driven by ratchet wheel II to rotate. Ratchet wheel II (160) and ratchet wheel I (64) rotate independently without interfering with each other when pawl (59) is controlled by lifting bar (60). Lifting bar (60) is installed on the side of the bearing frame (200) of cavity III (168) in the assembly frame (131) by a pin (69) for fixing the lifting bar, as shown in FIGS.

8 and 10. The spring (61) for resetting the lifting bar is also installed on the bearing frame side of the cavity III (168) in the assembly frame (131) with centering pin (70) and centering casing (71), which ensure the accurate resetting of lifting bar (60). Unlocking shifting fork (65) is an integral rigid part and has a pawl (163) and a pressing claw (161) on one side and a connecting rod on the other side, as shown in FIGS. 8 and 10. Unlocking shifting fork (65) is installed in cavity III (168) of the assembly frame (131). Shifting fork (65) can swing around the pivotal axis (82) of the shifting fork. A pin (81) is tightly fitted to the connecting rod of unlocking shifting fork (65), which controls the motion of the pawl (163) and the pressing claw (161) at the other end under the thrust force from the end K of valve core (119) of the combined solenoid valve assembly (4) and the reverse thrust force from the reset spring (80) of the shifting fork (65). The pawl and the claw of unlocking shifting fork (65) control the retention and release of ratchet wheel I (64) and the lifting and latching of lifting bar (60) respectively. Unlocking shifting fork (62) is an integral rigid part having a pawl (162) and a pressing claw (164) at one side and a connecting rod (165) at the other side, as shown in FIGS. 9 and 10. Ratchet wheel I (62) installed in cavity III (168) of assembly frame (131) by the pivotal axis (77) of the shifting fork II and can swing around the pivotal axis (77) of the shifting fork II. The connecting rod (165) of the unlocking shifting fork II (62) controls the motion of pawl at the other end under the pulling force from the end N of the valve core (114) of the combined solenoid valve assembly and the reverse pulling force from the reset spring (79) of the shifting fork II. The pawl of the unlocking shifting fork II (62) controls the lockup and release of the ratchet wheel II (160). The reset spring (80) of the shifting fork I and the reset spring (79) of the shifting fork II are installed in the cavity III (168) of the assembly frame (131) by the spindle (78) of the fork's reset spring. The contact (72) is installed on the ratchet wheel I (64) by the bolt II (73) and can rotate along with the ratchet wheel I (64). The contact (72) incorporates with the microswitch II (138) of the housing (5) and operates together with the lifting bar (60) to control the exactitude reset of the ratchet wheel I (64).

Brake force transmission assembly (3) functions to transfer a braking force from a wire rope (58) of solenoid valve assembly (4) to at least one brake force spring (51, 46) of energy-storage assembly (2) using at least one ratchet wheel (64, 160). When a moving or static object appears in the front of a moving automobile, requiring the automobile to slow down or otherwise avoid a collision, lower valve core (114) of the combined solenoid valve assembly (4) pulls the connecting rod (165) of unlocking shifting fork (62), as shown in FIG. 10, to release ratchet wheel II (160) via the shifting fork pawl, shown in FIG. 8, in order to transfer a braking force from flexible wire rope (58). When a decelerated automobile restores its normal speed after object is cleared, ratchet wheel II (160) is reset and the brake force exerted by flexible wire rope (58) is released. When a decelerating automobile must come to a full stop in order to avoid collision with an object, ratchet wheel (160) is maintained in a state of release and upper valve core (119) of the combined solenoid valve assembly (4) pushes the shifting fork I connecting rod (173) of the unlocking shifting fork I (65) to release the ratchet wheel I (64) by the pawl of the shifting fork I, as shown in FIGS. 8 and 10. During the course of releasing ratchet wheel (64), control is transferred from the claw of the shifting fork Ito the pawl (59) by the lifting bar (60). The force from the ratchet wheel I (64) is superimposed onto ratchet wheel II (160) by the mesh of the pawl (59) and the inner teeth of the ratchet wheel II (160). Braking force is transferred via flexible wire rope (58).

After the automobile is fully stopped, both ratchet wheel I (64) and ratchet wheel II (160) are reset to their initial positions and the brake force exerted on flexible wire rope (58) is relieved. When the emergency brake does not effectively enable deceleration, both ratchet wheels (160,64) are released to enable emergency braking. After braking, the wheels are reset to their original positions. In situations involving automatic decelerating, automatic normal braking or automatic emergency braking by the anticollision apparatus of the present invention, an auto-control assembly, not disclosed herein, may simultaneously initiate a temporary flame-out of an vehicle, regardless if the vehicle contains a gasoline engine, diesel engine or hybrid engine, which may be subsequently re-ignited after the threat of a collision has passed. This mechanism may be particularly advantageous because it may: enhance the braking effect to the automobile and eliminate or minimize the possibility of the disastrous consequence resulting from mistakenly stepping on the throttle as opposed to the brake due to driver panic.

Additionally, when an automobile is parked or kept in a garage, the auto-control assembly of the invention can release both ratchet wheel II (160) and ratchet wheel I (64) to constrain and lock the automobile's wheels. In this situation, the automobile would not be able to move regardless if the engine is initiated. The invention therefore may also function as an anti-theft mechanism having a coded lock.

IV. Combined Solenoid Valve Assembly

The combined solenoid valve assembly (4), as shown in FIGS. 1-15, may include: a locating block (84), a steel ball (85), a spring (86), a swinging arm (87), at least one pin (88, 89, 101, 102, 103, 104, 105, 108, 110, 111), a connecting rod (90), a guide block (91), at least one suitable fastener, such as a bolt (92), at least one safety valve end cap (93, 123), at least one safety valve spacer (94, 124), at least one safety valve coil (95, 125), at least one safety shifting fork or shifting form mechanism (96, 87, 99, 100), at least one valve core (98, 107, 114, 119), a linkage shifting fork (106, 109,), at least one unlocking coil (112, 117), an end cap (113, 121), at least one spacer (115, 122), at least one insulating flake (116, 118), a valve body (120).

Figure 12:
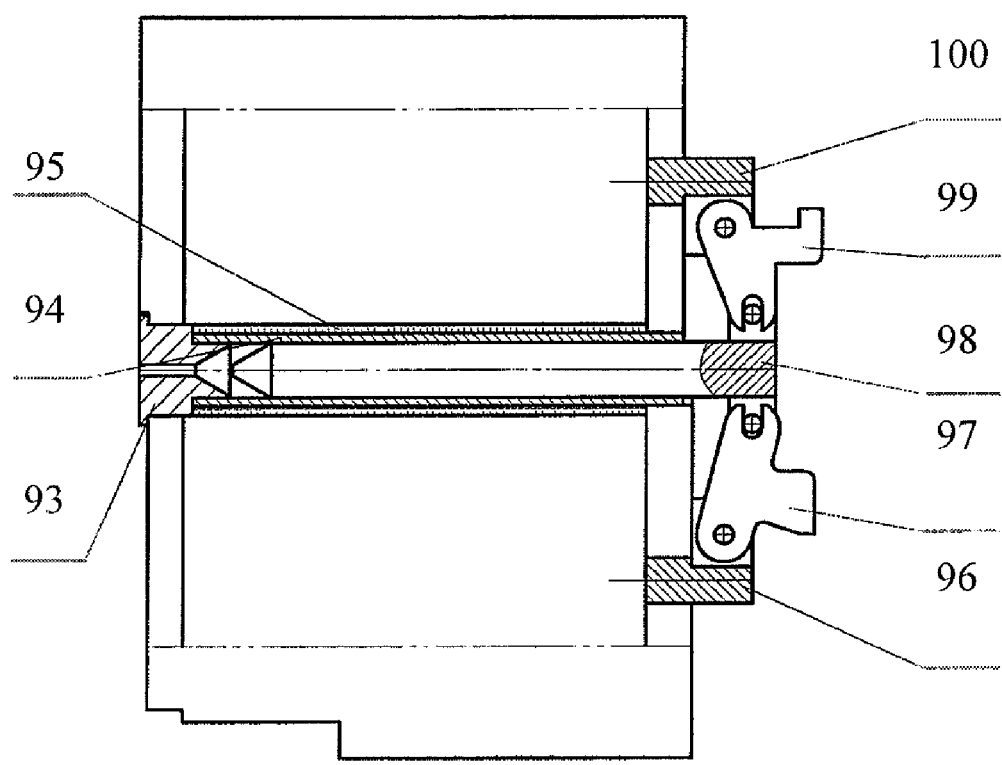
FIG. 12 shows a cross section B-B of FIG. 13.
Figure 13:
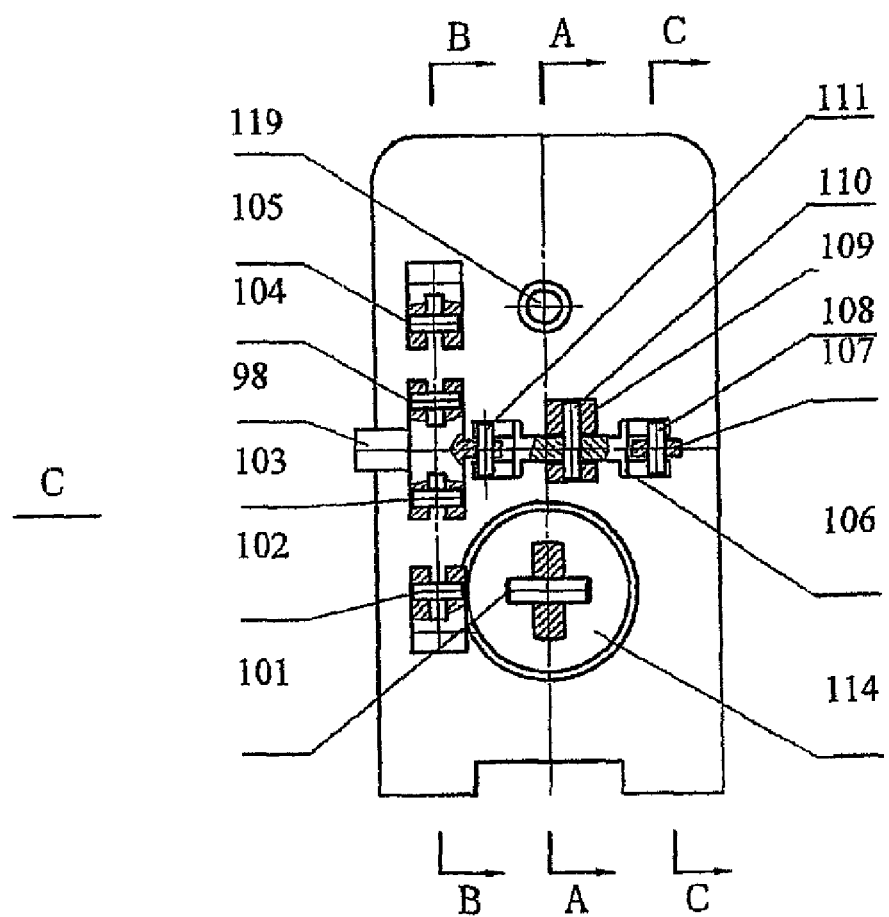
FIG. 13 shows the system of the combined solenoid valve assembly.
Figure 14:
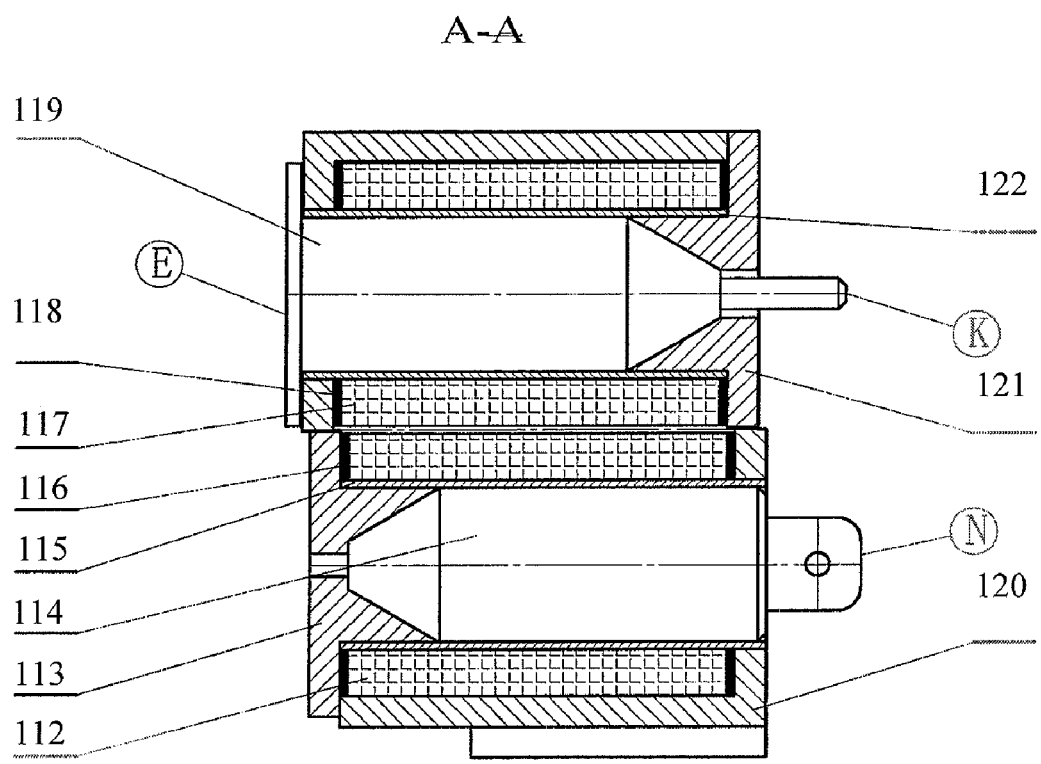
FIG. 14 shows a cross section A-A of FIG. 13.
Figure 15:
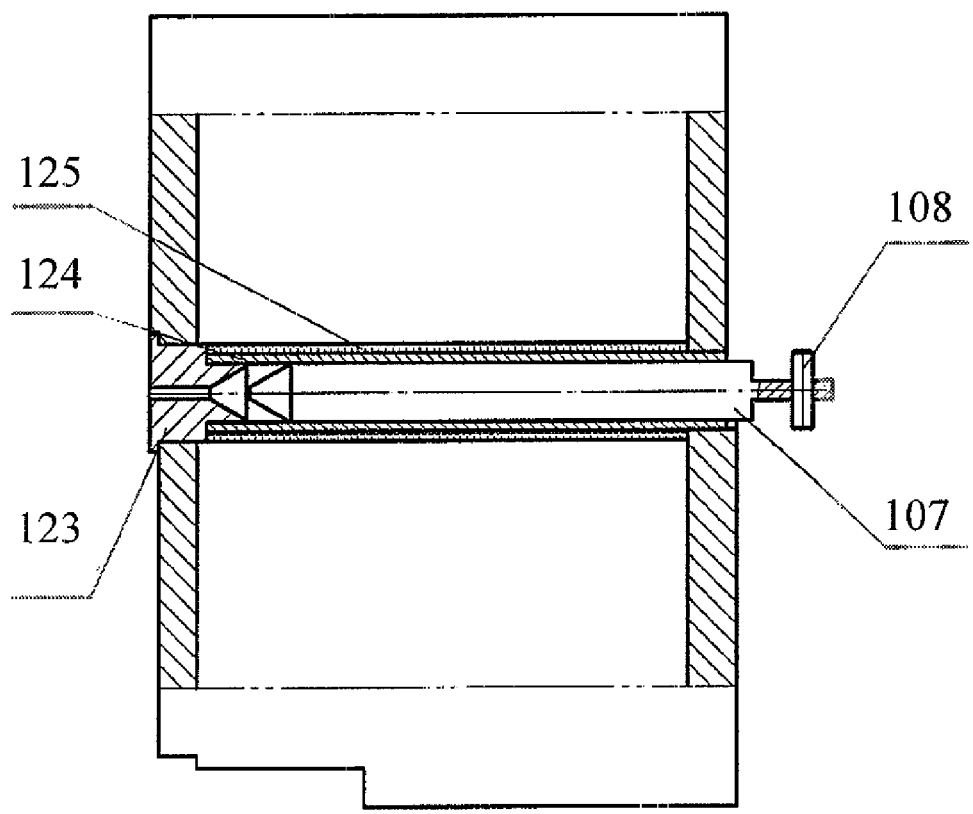
FIG. 15 shows a cross section C-C of FIG. 13.

The combined solenoid valve assembly (4) is installed in cavity III (168) of frame (131) of housing (5) by bolt (8), as shown in FIG. 1. The combined solenoid valve assembly (4) is composed by four solenoid valves: a left solenoid valve, a right solenoid valve, an upper solenoid valve and a lower solenoid valve. The valve body (120) is a common body shared by the four solenoid valves. Linkage shifting fork (106) is installed on basic linkage shifting fork (109) by pin (110) and can swing around pin (110), as shown in FIG. 13. The basic linkage shifting fork (109) is tightly fitted on valve body (120). Pin (111) is tightly fitted in the outer end of the safety valve core (98), and pin (108) is tightly fitted in the outer end of safety valve core (107). Safety valve core (98) and safety valve core (107) are operatively connected by linkage shifting fork (106). The safety valve spacer (94) and the safety valve spacer (124) position and support the safety valve core (98) and the safety valve core (107) respectively, as shown in FIGS. 12-13), in which the two valve cores can move axially. One end of safety valve spacer (94) and safety valve spacer (124) are installed on valve body (120), the other ends of the two spacers are fitted tightly to safety valve end cap (93) and safety valve's end cap (123) installed on valve body (120) respectively. The safety valve coil (95) and safety valve coil (125) are wound on safety valve spacer (94) and safety valve spacer (124) respectively. When safety valve coil (95) is powered and safety valve coil (125) is not powered, the safety valve core (98) moves in the direction of safety valve end cap I (93) and pulls the safety valve core (107) outwardly by linkage shifting fork (106). When safety valve coil (125) is powered but safety valve coil (95) is not powered, safety valve core II (107) moves in the direction of safety valve end cap (123) and pulls safety valve core (98) outwardly by linkage shifting fork (106). After safety valve core (98) reaches a desired location, steel ball (85) and locating block (84) control the location of safety valve core (98) to ensure that safety valve core (98) and safety valve core (107) will not move, regardless of their inertia or the vibration of the automobile while the automobile is moving (84). Two round grooves (201) are provided in locating block (84) for positioning steel ball (85). The locating block (84) is riveted to valve body (120). The steel ball (85) is movably installed in a round hole (202) of swinging arm (87) and is biased against locating block (84) by the tension of spring (86), which is movably installed in the same hole (202) of swinging arm (87). The swinging arm (87) is installed on valve body (120) by pin (88) and can swing around pin (88). Pin (89) is embedded in the groove formed in the upper end of swinging arm (87). The guide block (91) is installed on the valve body (120) by bolt (92). The connecting rod (90) can slide smoothly in the groove of guide block (91) either in the left direction or in the right direction. The left end of the connecting rod (90) is tightly mounted with pin I (89). The right end of the connecting rod (90) is provided with a small square hole, in which a square claw formed on an outer end of safety valve core (98) is installed. Hence, the motion of safety valve core (98) makes the connecting rod (90) slide. The sliding motion of the connecting rod (90) in turn makes swinging arm (87) swing. The positioning control of locating block (84) to the steel ball (85) controls safety valve core (98). The safety shifting fork (99) is installed in the groove of safety shifting fork mechanism (100) by pin (105), as shown in FIG. 12-13, and can swing around pin (105). The safety shifting fork mechanism (100) is tightly fitted to upper end cap (121) which is installed on valve body (120). The safety shifting fork (97) is installed in the groove of safety shifting fork mechanism (96) by pin (102) and can swing around pin (102). The safety shifting fork mechanism (96) is fitted tightly on valve body (120). Pin (104) and pin (103) are fitted tightly to the upper and lower portion of the outside of safety valve core (98) respectively. A groove is formed in the lower end of safety shifting fork (99), which is movably coupled to safety valve core (98) via the groove, which is secured by pin (104). A groove is formed in the lower end of safety shifting fork (97), which is coupled to safety valve core (98) via the groove, which is secured by pin (103). Hence the motion of safety valve core (98) in axial direction can drive safety shifting fork (99) and safety shifting fork (97) to swing at the same time. When safety valve core (98) is positioned at the right end, the safety shifting fork (99) and safety shifting fork (97) are both oriented in a horizontal position. The protruding upper portion of safety shifting fork (99) then locks the lower end of the connecting rod of unlocking shifting fork (65), so the unlocking shifting fork (65) can not move. The lower end of safety shifting fork (97) locks the connecting rod of the unlocking shifting fork (62) so that the unlocking shifting fork (62) can not move. When safety valve core (98) is positioned at the left end, the safety shifting fork (99) and safety shifting fork (97) release unlocking shifting fork (65) and unlocking shifting fork (62) respectively, at this point both unlocking shifting fork (65) and unlocking shifting fork (62) can move. One end of spacer (122) is installed on valve body (120), as shown in FIG. 14. The other end of spacer (122) is installed on end cap (121), which is installed on valve body (120). Unlocking coil (117) winds on spacer (122). The two ends of unlocking coil (117) are embedded with insulating flakes (118). The upper valve core (119) is installed in spacer (122). By enlarging the cross section area of end E of the upper valve core (119), the pulling force can be increased effectively. When unlock coil (117) is powered, valve core (119) is pulled to the right. At this point, end K of valve core (119) pushes connecting rod of the unlocking shifting fork (65), which in turn pushes the pawl of unlocking shifting fork (65) to unlock ratchet wheel (64). When unlocking coil (117) is not powered, unlocking shifting fork (65) is reset under the tension of reset spring (80) and the upper valve core (119) is pushed back to the left end. One end of spacer (115) is installed on valve body (120), the other end is installed on lower end cap (113). The lower end cap (113) is installed on valve body (120). Unlock coil II (112) winds on spacer (115). The two ends of unlocking coil (112) are embedded with insulating flake (116). The valve core (114) is installed in spacer (115). When unlocking coil (112) is powered, the lower valve core (114) is pulled to the left end. The pin (101) is fitted tightly to end N of lower valve core (114), which pulls the connecting rod of unlocking shifting fork (62), which in turn pulls the pawl of unlocking shifting fork II (62) to unlock ratchet wheel II (160). When unlocking coil (112) is not powered, the unlocking shifting fork (62) is reset under the effect of the reset spring (79) on the shifting fork (62) and lower valve core (114) is pulled back to the right end. The combined solenoid valve assembly functions to receive commands from the control assembly to unlock ratchet wheel II (160) and ratchet wheel I (64) as desired, and to prevent an abnormal unlocking of the ratchet wheel II (160) and the ratchet wheel I (64) caused by the movement or bumping of the automobile.

V. Variable Diameter Assembly

Figure 19:
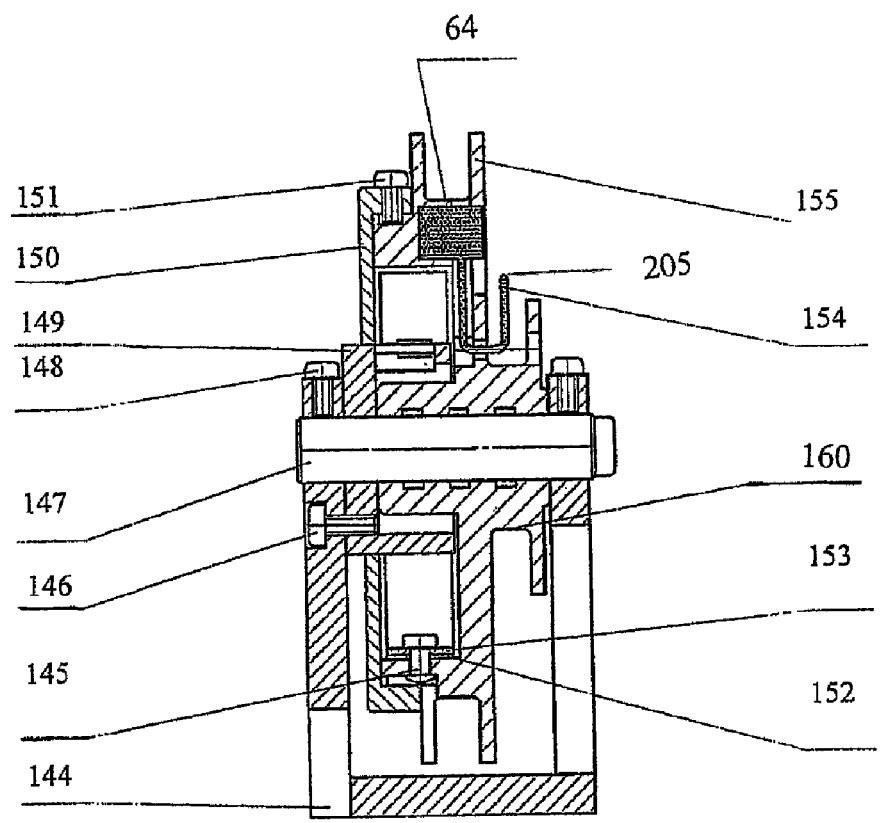
FIG. 19 is a diagram of the variable diameter wheel assembly.
Figure 20:
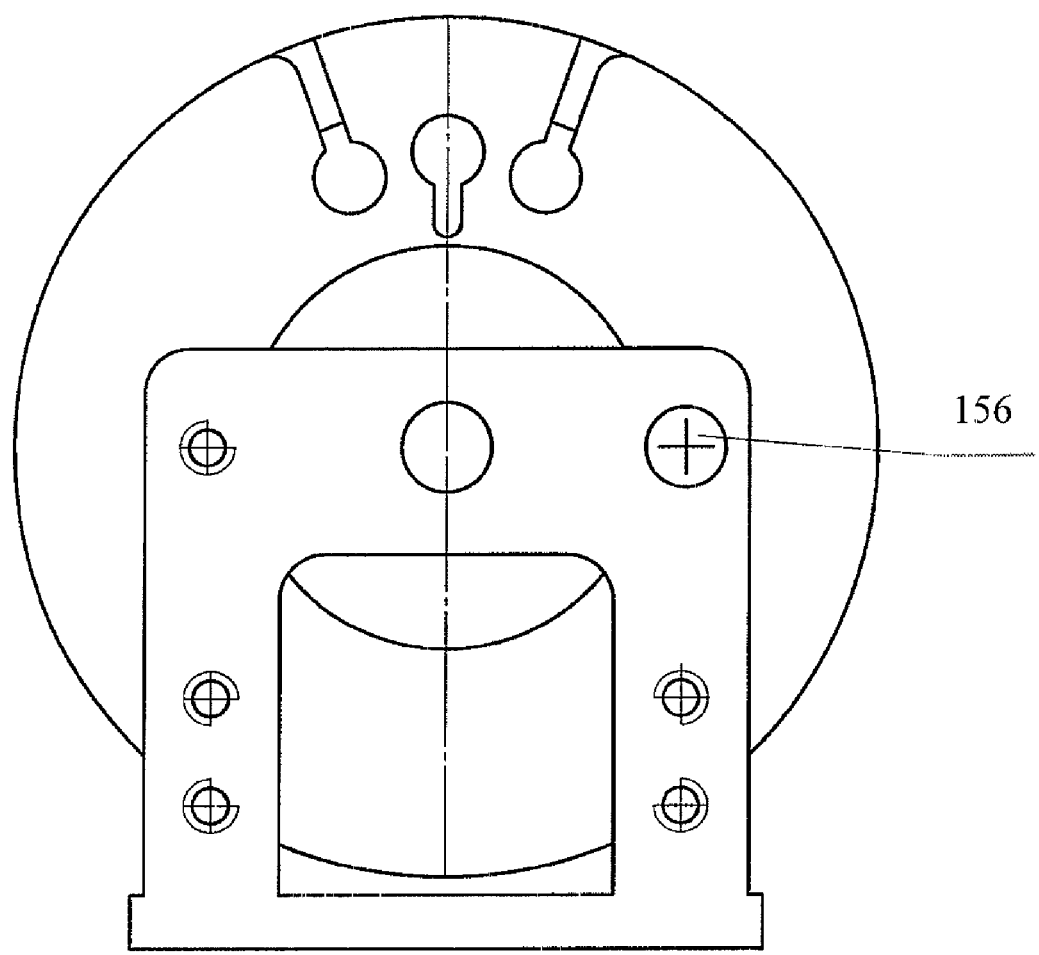
FIG. 20 shows a portion of the variable diameter wheel assembly.

Variable diameter assembly (6) of the anticollision apparatus, as shown in FIGS. 19-20, may include a basic support mechanism (144), at least one suitable fastener, such as rivet (145) or bolt (146, 148, 151), a spindle (147), a dustproof cap (150), a clockwork spring (152), a liner (153), a flexible wire rope (154), a variable diameter wheel (155), and a bumper pin (156). The variable diameter wheel (155) may include a large diameter wheel and a small diameter wheel with grooves to facilitate winding of flexible wire rope (154, 58). The large diameter wheel connects and tightly winds a flexible wire rope (58) that is connected to brake force transmission assembly (3); the small diameter wheel is flexibly connected to a brake pedal (205) through another flexible wire rope (154).

The variable diameter wheel assembly functions to: i) transfer the force from the brake pedal (205); ii) magnify the pulling force, i.e. the force applied to the brake force transmission assembly, by adjusting the diameters of the large diameter wheel and the small diameter wheel to enable braking; and iii) ensure that the manual braking operation and the automatic anticollision braking operation do not interfere with each other.

VI. Reset Mechanism

Figure 21:
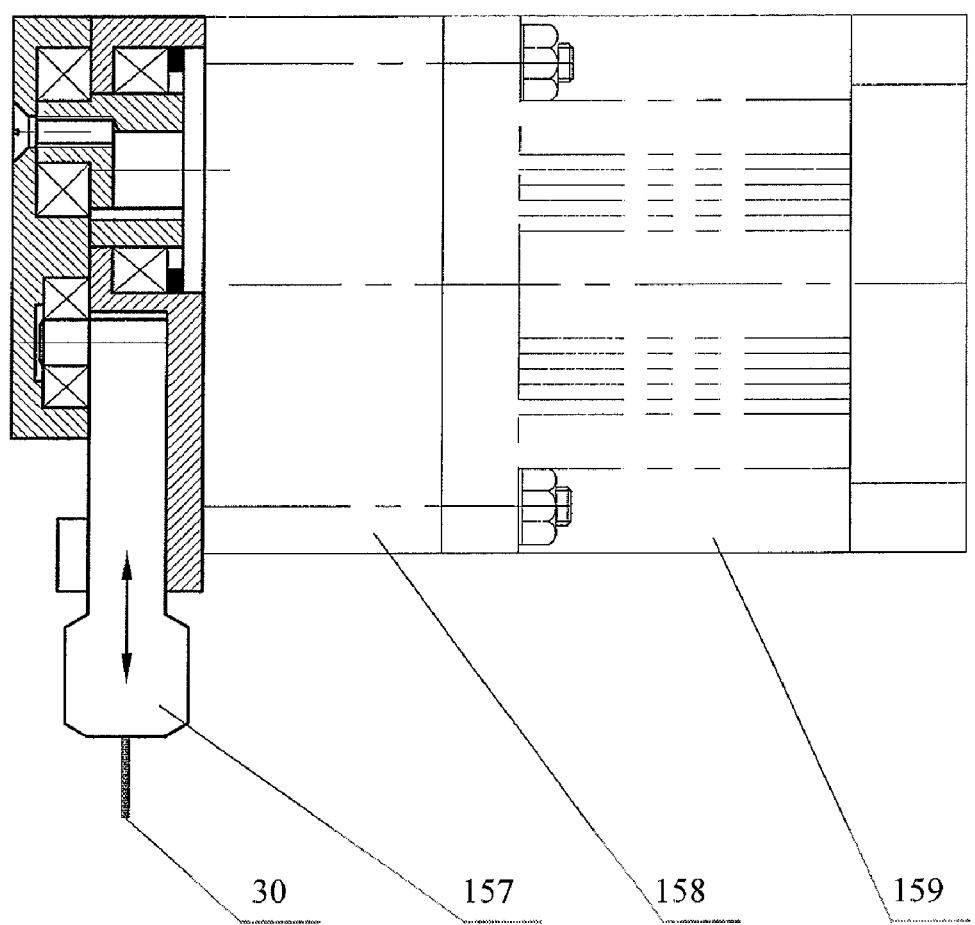
FIG. 21 is diagram of the reset mechanism.

As shown in FIG. 21, reset mechanism (7) may include a pull rod (157), a micro-speed shifting mechanism (158), and a micro-motor (159). When micro-motor (159) is powered, it drives micro-speed shifting mechanism (158) to rotate. The rotation of micro-speed shifting mechanism (158) will in turn drive pull rod (157) to move reciprocally. The outer end of the pull rod (157) is coupled to the flexible wire rope (30) of the combined clutch (1). Optionally, signal control switches can be provided at suitable locations on the viable diameter assembly to provide a dual fail-safe for the micro-motor of the reset mechanism.

The reset mechanism functions to reset the energy-storage assembly (2) by applying a very small rotational moment via combined clutch (1), which transforms and magnifies the rotation moment by several degrees to enable resetting. Reset mechanism (7) notably also minimizes the dimension of the invention.

VII. Combined Clutch

Figure 5:
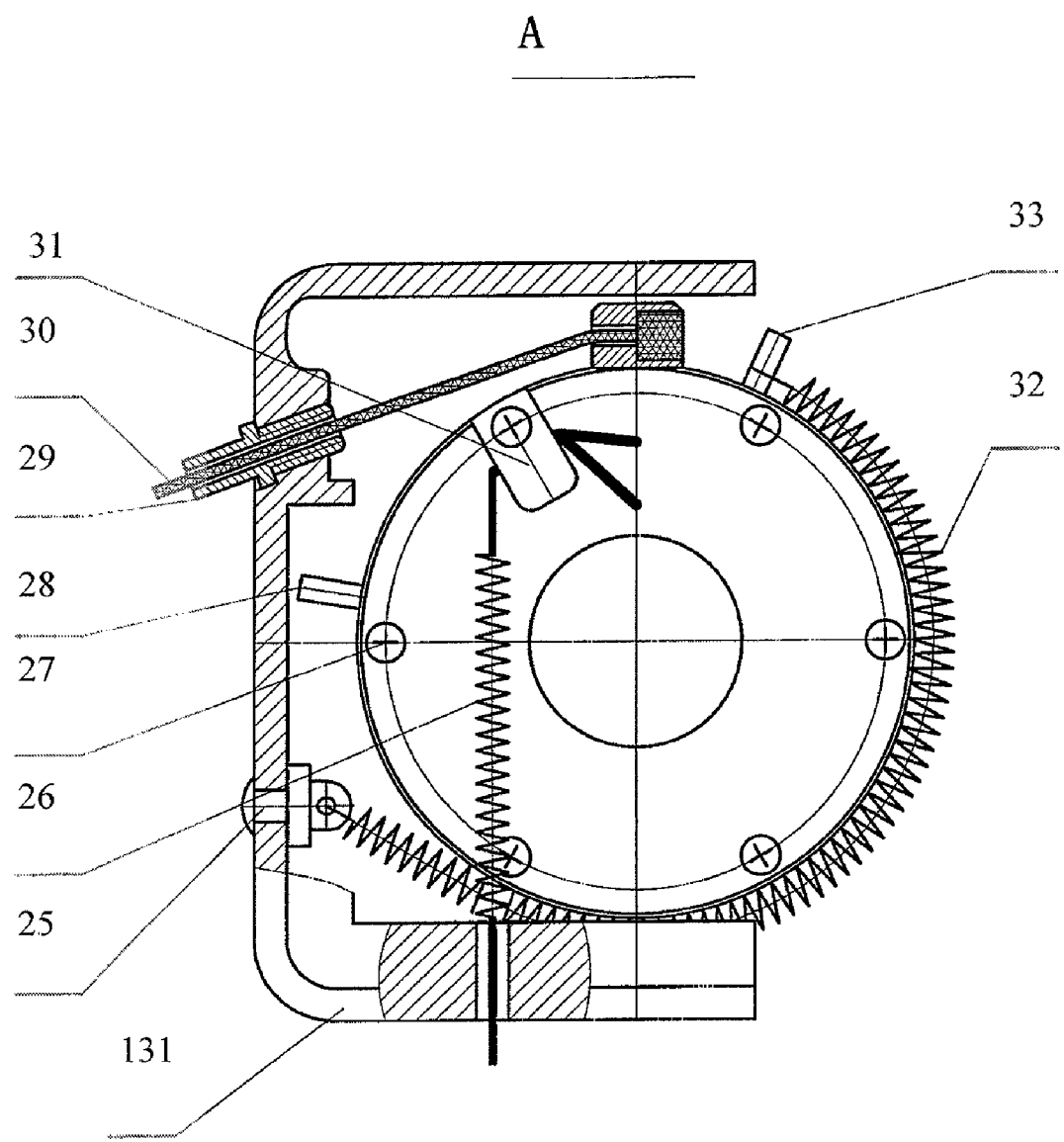
FIG. 5 is a drawing of the combined clutch assembly.

As shown in FIGS. 4-5, the combined clutch (1) may include at least one coil (9, 20, 16), a valve body (10), an end cap (11), a cover plate (12), a spring (13), a check ring (14), a spacer (15), a pole (17), a contact block (18), a fastener, such as a bolt (19, 27), an overrunning clutch (21), a steel ball (22), a support cover (23), a valve core (24), a fastener, such as a bolt (25), a wave wire (26), apin (28, 33), a rope guiding sleeve (29), a flexible wire rope (30), a wire-pressing plate (31), and a pull spring (32). Overrunning clutch (21), which provides a one-way locking mechanism, is embedded in valve core (24). The inner hole of the overrunning clutch (21) connects with end A of the energy-storage assembly spindle (34); a support cover (23) is provided in between overrunning clutch (21) and spindle (34).

The combined clutch is driven by reset mechanism (7) to power and wind the spring of the energy-storage assembly. When coil (16) is powered, coil, (9) and coil (20), each having a plurality of teeth mesh together. The extended steel rope (30) of the combined clutch (1), which is connected to the pull rod (157) of reset mechanism (7), is driven by the back and forth movement of the reset structure. Combined clutch (1) transfers the torque generated by the reset mechanism (7) to the energy-storage assembly (2). The contact block (18), rotating in-phase with the energy-storage assembly's core axis (34), contacts basic assembly's micro-switch (142), as shown in FIG. 18, to accurately reset ratchet wheel II (160) of brake transfer assembly (3), shown in FIG. 8, and to control or stop the micro-engine of the reset structure (7). When the coil (16) is not powered, coil (9) separates from coil (20) under the tension of the spring (13), to prepare for deceleration or brake. The signal control from micro-switch (126) of the housing, as shown in FIG. 16, ensures that the torque of the combined clutch may be instantly transferred to the energy storage assembly in order to execute deceleration or braking.

The anticollision system of the present invention combines a collision sensor, capable of detecting and/or predicting the possibility of any imminent collision, with an anticollision apparatus to prevent the occurrence of a collision and/or minimize the damage resulting from collision. The anticollision system of the present invention may also be able to alert the driver of an imminent collision using an alarm or light means. The invention is advantageous in that it is capable of automatically responding to a dangerous situation by automatically and promptly braking, so as to avoid a traffic accident. Furthermore, it is capable of correcting for improper operation of a vehicle due to driver panic. Notably, the small and light weight anticollision apparatus is capable of enabling rapid and automatic control of an automobile.

The invention claimed is:

1. An anticollision apparatus for an automobile comprising:
    a clutch (1), wherein the clutch (1) comprises:
        a first teeth coil (9), a first valve body (10), a first end cap (11), a cover plate (12), a first spring (13), a check ring (14), a spacer (15), a coil (16), a pole (17), a contact block (18), a first bolt (19), a second teeth coil (20), an overrunning clutch (21), a steel ball (22), a support cover (23), a valve core (24), a fastener (25), a wave wire (26), a stop pin (28), a first rope guiding sleeve (29), a first flexible wire rope (30), a wire-pressing plate (31), a pull spring (32), and a first pin (33) for fitting the spring, and
        wherein the overrunning clutch (21) is embedded in the valve core (24) and
    provides a one-way locking force;
    an energy-storage assembly (2);
    a brake force transmission assembly (3);
    a solenoid valve assembly (4);
    a housing (5);
    a variable diameter wheel assembly (6); and
    a reset structure (7).

2. The apparatus of claim 1, wherein the locations of the clutch, the solenoid valve assembly and the brake force transmission assembly are interchangeable.

3. The anticollision apparatus of claim 1, wherein said energy-storage assembly comprises a second spring for providing a braking force, wherein said brake force transmission assembly comprises a ratchet wheel and wherein said second spring is operatively associated with said ratchet wheel via a spindle.

4. The anticollision apparatus of claim 1, wherein the housing (5) comprises: a first micro-switch (126), a second end cap (127), a first air proof seal (128), a second bolt (129), a first bearing cap (130), a frame (131), a second bearing cap (132), a second air proof seal (134), a third end cap (135), a second micro-switch (138), an air proof casing (140), and a third micro-switch (142);
    wherein the frame (131) of the housing (5) comprises: a first cavity (166), a second cavity (167), and a third cavity (168) and wherein the clutch (1) is located in the first cavity (166), wherein the energy-storage assembly (2) is located in the second cavity (167), and wherein the brake force transmission assembly (3) and the solenoid valve assembly (4) are located in the third cavity (168);
    wherein the housing (5) further comprises semicircle-shaped holes serving as bearing frames that are formed between the first and second cavities (166, 167) and between the second and third cavities (167, 168);
    wherein the second end cap (127) and the third end cap (135) of the housing (5) are located at two ends of the frame (131) and wherein the first air proof seal (128) and the second air proof seal (134) are located adjacent to the second end cap (127) and the third end cap (135), respectively;
    wherein the second micro-switch (138) of the housing (5) is located on the second bearing cap (132) and wherein the third micro-switch (142) is located on the first bearing cap (130); and
    wherein the air proof casing (140) of the housing (5) is located on the frame (131).

5. The anticollision apparatus of claim 1, wherein the energy-storage assembly (2) comprises: a spindle (34), a first bearing (35), at least one rivet (36), a first external block (37), a first internal block (52), a second external block (38), a liner (50), a second bearing (41), a partition board (43), a third bearing (44), a second spring (51), a third spring (46), a second internal block (47), a fourth bearing (48), and a transmission shaft (49);
    wherein an inner end of the second spring (51) of the energy-storage assembly (2) is riveted to the spindle (34) and wherein an outer end of the second spring (51) is riveted to a first cavity (167) of the housing (5);
    wherein an inner end of the third spring (46) of the energy-storage assembly (2) is riveted to the transmission shaft (49) and wherein an outer end of the third spring (46) is riveted to the first cavity (167) of the housing (5);
    wherein the first bearing (35) of the energy-storage assembly (2) engages with one end of the spindle (34) and is located in a bearing hole between the first cavity (167) and a second cavity (166) of the housing (5);

wherein the second bearing (41) of the energy-storage assembly (2) engages one end of the transmission shaft (49) and is located in a bearing hole between the first cavity (167) and a third cavity (168) of the housing (5);

wherein the third and fourth bearings (44, 48) of the energy-storage assembly (2) are located in two inner holes of the transmission shaft (49) and wherein the third and fourth bearing engage the spindle (34);

wherein the partition board (43) of the energy-storage assembly (2) is tightly fitted on an end of the transmission shaft (49) for isolating the second spring (51) and the third spring (46);

wherein one end of the spindle (34) of the energy-storage assembly (2) is located in an inner hole of the overrunning clutch (21) of the clutch (1), such that one end of the spindle (34) is coupled to an inner ring (66) of a ratchet wheel of the brake force transmission assembly (3); and wherein one end of the transmission shaft (49) of the energy-storage assembly (2) is coupled to the ratchet wheel (64) of the brake force transmission assembly, and wherein both the spindle (34) and the transmission shaft (49) can rotate freely on their respective axis.

6. The anticollision apparatus of claim 1, wherein the brake force transmission assembly (3) comprises: a pressing plate (53), a second bolt (54), a first pawl (59), a spring for resetting the first pawl (56), a second rope guiding sleeve (57), a second flexible wire rope (58), a lifting bar (60), a spring for resetting the lifting bar (61), a first unlocking shifting fork (65), a second unlocking shifting fork (62), a first ratchet wheel (64), a second ratchet wheel (160), an outer ring of the second ratchet wheel (63), an inner ring of the second ratchet wheel (66), a key pin (67), a rope buckle (68), a pin for fixing the lifting bar (69), a centering pin (70), a centering casing (71), a contact device (72), a gasket (75), a first washer (76), a pivotal axis of the second unlocking shifting fork (77), a reset spring spindle of the first unlocking shifting fork (78), a reset spring of the second unlocking shifting fork (79), a reset spring of the first unlocking shifting fork (80), a pivotal axis of the first unlocking shifting fork (82), and a second washer (83);

wherein the first ratchet wheel (64) is connected with an end of a transmission shaft (49) of the energy storage assembly (2), wherein the first pawl (59) is located on one side of the first ratchet wheel (64), and wherein the pressing plate (53), the bolt (54) and a second pin (55) are located on the first ratchet wheel (64) so as to fix and center the spring for resetting the first pawl (56);

wherein in the second ratchet wheel (160) is integral with the outer ring of the second ratchet wheel (63) and wherein the inner ring of the second ratchet wheel (66) is coupled to an end of a spindle (34) of the energy-storage assembly (2), wherein the key pin (67), the gasket (75), and a second bolt (74) prevent the inner ring of the second ratchet wheel (66) from rotating and separating from the end of the spindle (34);

wherein an annular groove is formed on the outer ring of the second ratchet wheel (160) for winding the second flexible wire rope (58), wherein an end of the second flexible wire rope (58) is attached to the outer ring of the second ratchet wheel (160) by the rope buckle (68) such that the second flexible wire rope (58) winds on the outer ring of the second ratchet wheel (160) and extends through the second rope guiding sleeve (57), wherein the first pawl (59) engages with inner teeth of the outer ring of the second ratchet wheel (160) when the first pawl (59) is free of the lifting bar (60), so that the first ratchet wheel (64) drives or is driven by the second ratchet wheel (160) to rotate independently of and without interfering with the first ratchet wheel (64) when the first pawl (59) is controlled by the lifting bar (60);

wherein the lifting bar (60) is located on a side of a bearing frame of a cavity (168) in an assembly frame (131) of housing (5), wherein the spring for resetting the lifting bar (61) is located on the bearing frame to ensure the accurate resetting of the lifting bar (60);

wherein the first unlocking shifting fork (65) is rigid and comprises: a second pawl, a first pressing claw, and a first connecting rod, and wherein the second pawl and first pressing claw are located on a first side of the first unlocking shifting fork, wherein the first connecting rod is located on a second side of the first unlocking shifting fork, wherein the first unlocking shifting fork (65) is located in the cavity (168) of housing (5), and wherein a third pin (81) is tightly fitted to the first connecting rod of the first unlocking shifting fork (65);

wherein the second unlocking shifting fork (62) is rigid and comprises: a third pawl, a second pressing claw, and a second connecting rod, and wherein the third pawl and second pressing claw are located on a first side of the second unlocking shifting fork and wherein the second connecting rod is located on a second side of the second unlocking shifting fork, wherein the first ratchet wheel (64), the reset spring (80) of the first unlocking shifting fork (65), and the reset spring (79) of the second unlocking shifting fork (62) are located in the cavity (168) of housing (5); and wherein the contact device (72) is located on the first ratchet wheel (64) and is operatively associated with a second micro-switch (138) of the housing (5) and the lifting bar (60).

7. The apparatus of claim 6, wherein the outer ring of second ratchet wheel (160) is integral with the inner ring of the second ratchet wheel (160).

8. The apparatus of claim 7, wherein at least one of said ratchet wheels is separable from the brake force transmission assembly and comprises at least one groove.

9. The apparatus of claim 7, wherein the location of the clutch, the solenoid valve assembly and the brake force transmission assembly are interchangeable.

10. The apparatus of claim 6, wherein at least one of said ratchet wheels is separable from the brake force transmission assembly, and wherein said ratchet wheel comprises a groove.

11. The anticollision apparatus of claim 1, wherein the solenoid valve assembly (4), installed in a cavity (168) of a frame (131) of housing (5), comprises: a left solenoid valve, a right solenoid valve, an upper solenoid valve, a lower solenoid valve, a second valve body (120), a locating block (84), a second steel ball (85), a second spring (86), a swinging arm (87), a connecting rod (90), a guide block (91), a second safety shifting fork mechanism (96), a second safety shifting fork (97), a first safety shifting fork (99), a first safety shifting fork mechanism (100), a linkage shifting fork (106), a linkage shifting fork mechanism (109),and a second safety valve coil (125);

wherein the left solenoid valve comprises: a first safety valve end cap (93), a first safety valve spacer (94), a first safety coil (95), a first safety valve core (98), a second pin (103), a third pin (104), and a fourth pin (111);

wherein the right solenoid valve comprises: a second safety valve core (107), a fifth pin (108), a second safety valve end cap (123), a second safety valve spacer (124), and a second safety valve coil;

wherein the upper solenoid valve comprises: a first unlocking coil (117), a first insulating flake (118), an upper valve core (119), an upper end cap (121), and a first spacer (122);

wherein the lower solenoid valve comprises: a second unlocking coil (112), a lower end cap (113), a lower valve core (114), a second spacer (115), a second insulating flake (116) and a sixth pin (101);

wherein the linkage shifting fork (106) is located on the linkage shifting fork mechanism (109), which is tightly fitted on the second valve body (120);

wherein the first safety valve spacer (94) of the left solenoid valve and the second safety valve spacer (124) of the right solenoid valve are positioned to support the first and second safety valve cores (98, 107), respectively, so as to enable the first and second safety valve cores to move axially, wherein a first end of the first safety valve spacer (94) and a first end of the second safety valve spacer (124) are installed on the second valve body (120), and wherein a second end of the first safety valve spacer and a second end of the second safety valve spacer are tightly fitted to the first and second safety valve end caps (93, 123), respectively;

wherein the first and second safety valve coils (95, 125) are wound on the first and second safety valve spacers (94, 124), respectively;

wherein the locating block (84), riveted to the second valve body (120), comprises: two round grooves for positioning the second steel ball (85), wherein the second steel ball (85) is located in a round hole of the swinging arm (87) and is biased against the locating block (84) by the tension of the second spring (86), and wherein the second spring (86) is located in the hole of the swinging arm (87);

wherein the swinging arm (87) is located on the second valve body (120);

wherein the guide block (91) is located on the second valve body (120), wherein the connecting rod (90) can slide smoothly in a groove of the guide block (91) either in the left direction or in the right direction;

wherein the first safety shifting fork (99) is installed in a groove of the first safety shifting fork mechanism (100) and wherein the first safety shifting fork mechanism (100) is tightly fitted to the upper end cap (121);

wherein the second safety shifting fork (97) is installed in a groove of the second safety shifting fork mechanism (96) and wherein the second safety shifting fork mechanism (96) is fitted tightly on the second valve body (120);

wherein a first end of the first spacer (122) is located on the second valve body (120) and wherein a second end of the first spacer (122) is located on the upper end cap (121) of the second valve body, wherein the first unlocking coil (117) winds around the first spacer (122), wherein two ends of the first unlocking coil (117) are embedded with the first insulating flake (118), and wherein the upper valve core (119) is located in the first spacer (122); and wherein a first end of the second spacer (115) is located on the second valve body (120), wherein a second end of the second spacer (115) is located on the lower end cap (113) of the second valve body, wherein the second unlocking coil (112) winds on the second spacer (115), wherein two ends of the second unlocking coil (112) are embedded with the second insulating flake (116), and wherein the lower valve core (114) is located in the second spacer (115).

12. The anticollision apparatus of claim 1, wherein the variable diameter assembly (6) comprises: a support mechanism (144), a rivet (145), a second bolt (146), a spindle (147), a dustproof cap (150), a clockwork spring (152), a liner (153), a second flexible wire rope (154), a variable diameter wheel (155), and a bumper pin (156);

wherein the variable diameter wheel (155) comprises: a first wheel and a second wheel having different diameters, wherein each wheel comprises grooves to facilitate the winding of the second flexible wire rope (58), wherein the first wheel connects to and winds the flexible wire rope (58) that extends from the brake force transmission assembly, and wherein the second wheel is connected to a brake pedal of an automobile via the flexible wire rope (58); and wherein the reset mechanism (7) of the anticollision apparatus comprises a pull rod (157), a micro speed shifting mechanism (158), and a micro-motor (159).

13. The apparatus of claim 12, wherein said apparatus further comprises a signal control switch that functions as a fail-safe mechanism for controlling the micro-motor (159) of the reset structure.

14. The apparatus of claim 13, wherein the location of the clutch, the solenoid valve assembly and the brake force transmission assembly are interchangeable.

* * * * *